US012142859B2

(12) United States Patent
Oosaka et al.

(10) Patent No.: US 12,142,859 B2
(45) Date of Patent: Nov. 12, 2024

(54) CONNECTOR, AND CONNECTOR ASSEMBLY

(71) Applicant: Japan Aviation Electronics Industry, Limited, Tokyo (JP)

(72) Inventors: Junji Oosaka, Tokyo (JP); Yohei Yokoyama, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 387 days.

(21) Appl. No.: 17/690,564

(22) Filed: Mar. 9, 2022

(65) Prior Publication Data

US 2022/0368045 A1 Nov. 17, 2022

(30) Foreign Application Priority Data

May 17, 2021 (JP) ................................ 2021-082870
May 24, 2021 (JP) ................................ 2021-086800
May 24, 2021 (JP) ................................ 2021-086902

(51) Int. Cl.

| | |
|---|---|
| ***H01R 12/00*** | (2006.01) |
| ***H01R 12/71*** | (2011.01) |
| ***H01R 13/502*** | (2006.01) |
| ***H01R 13/504*** | (2006.01) |
| ***H01R 13/518*** | (2006.01) |
| ***H01R 13/629*** | (2006.01) |
| ***H01R 13/6585*** | (2011.01) |

(52) U.S. Cl.

CPC ......... *H01R 12/716* (2013.01); *H01R 13/502* (2013.01); *H01R 13/504* (2013.01); *H01R 13/518* (2013.01); *H01R 13/629* (2013.01); *H01R 13/6585* (2013.01)

(58) Field of Classification Search

CPC ..... H01R 13/502; H01R 13/631; H01R 24/62
USPC ........................................................... 439/74
See application file for complete search history.

(56) References Cited

U.S. PATENT DOCUMENTS

2015/0004836 A1 1/2015 Asai
2019/0103699 A1* 4/2019 Yamanaka ........... H01R 13/665
2019/0280409 A1 9/2019 Hoshiba et al.

FOREIGN PATENT DOCUMENTS

CN 111029858 A 4/2020
JP 2018-116925 A 7/2018
JP 2019-121439 A 7/2019
JP 2019-139938 A 8/2019
(Continued)

*Primary Examiner* — Phuong K Dinh
(74) *Attorney, Agent, or Firm* — Muncy, Geissler, Olds & Lowe, P.C.

(57) ABSTRACT

Provided is a connector capable of suppressing deformation and breakage due to an external force, and the connector can be fitted with a counter connector by entering an accommodation space of the counter connector, and includes a housing that holds a contact and includes a side wall at an end portion in a first direction intersecting a fitting direction in which the connector and the counter connector are fitted with each other, a frame that surrounds the housing, and a reinforcing member having a higher rigidity than that of the housing, in which connector, part of the reinforcing member is attached to the side wall while being interposed between an outer surface and an inner surface of the side wall, the outer surface being situated on a side facing the frame, and the inner surface being situated on an opposite side from the outer surface.

17 Claims, 14 Drawing Sheets

(56) References Cited

FOREIGN PATENT DOCUMENTS

| | | | |
|---|---|---|---|
| JP | 2019-192656 | A | 10/2019 |
| TW | 201501423 | A | 1/2015 |

* cited by examiner

CONNECTOR, AND CONNECTOR ASSEMBLY

BACKGROUND OF THE INVENTION

The present invention relates to a connector that can be fitted with a counter connector by entering an accommodation space of the counter connector, and a connector assembly composed of the connector and the counter connector.

Some connectors including the connector (hereinafter, referred to as connector 1) described in JP2019-192656 A (hereinafter, Patent Literature 1) are used as being fitted with a counter connector. As illustrated in FIG. 16, the connector 1 is fitted with a counter connector 2 by entering an accommodation space of the counter connector 2.

In addition, as illustrated in FIG. 17, the connector 1 is constructed such that contacts 4 are fixed to a housing 3 made of an insulating plastic or the like while a shield shell 5 (frame body) surrounds the housing 3. The housing 3 includes side walls 6 each facing an inner peripheral surface of the shield shell 5.

SUMMARY OF THE INVENTION

In the connector 1 described above, an external force may be applied to the shield shell 5 from a lateral side of the shield shell 5. Particularly, in a state where the connector 1 is fitted with the counter connector 2, the shield shell 5 is in contact with the counter connector 2 and hence easily receives an external force. When receiving an external force, the shield shell 5 shifts to an inside of the connector 1 to press the side wall 6 of the housing 3. At this time, the side wall 6 may be deformed or broken due to the pressing force from the shield shell 5.

The present invention has been made in view of the above circumstances and is aimed at attaining an object described below. The present invention has an object of providing a connector and a connector assembly capable of suppressing deformation and breakage due to an external force, solving the conventional problem described above.

In order to attain the above-described object, a connector according to the invention can be fitted with a counter connector by entering an accommodation space of the counter connector, and the connector includes: a housing that holds a contact and includes a side wall at an end portion in a first direction intersecting a fitting direction in which the connector and the counter connector are fitted with each other, a frame that surrounds the housing, and a reinforcing member having a higher rigidity than that of the housing, wherein part of the reinforcing member is attached to the side wall while being interposed between an outer surface and an inner surface of the side wall, the outer surface being situated on a side facing the frame, and the inner surface being situated on an opposite side from the outer surface.

In the connector of the invention, part of the reinforcing member is attached to the side wall while being interposed between the outer surface and the inner surface of the side wall of the housing. According to this configuration, when an external force in the first direction is applied from the frame to the side wall of the housing, since the part of the reinforcing member attached to the side wall resists the external force, deformation and breakage of the side wall can be suppressed.

In addition, in order to attain the object described above, a connector assembly according to the invention is configured such that a connector enters an accommodation space of a counter connector to be thereby fitted with the counter connector, and the connector includes: a housing that holds a contact and includes a side wall at an end portion in a first direction intersecting a fitting direction in which the connector and the counter connector are fitted with each other, a frame that surrounds the housing, and a reinforcing member having a higher rigidity than that of the housing, wherein part of the reinforcing member is attached to the side wall while being interposed between an outer surface and an inner surface of the side wall, the outer surface being situated on a side facing the frame, and the inner surface being situated on an opposite side from the outer surface.

According to the connector assembly of the invention, since the reinforcing member attached to the side wall of the connector can resist an external force in the first direction applied to the side wall of the housing, deformation and breakage of the side wall can be suppressed.

DETAILED DESCRIPTION OF THE INVENTION

A connector according to an embodiment of the invention is described below with reference to a configuration example shown in the appended drawings.

The embodiment described below is only an example Presented for easy understanding of the invention, and the invention is by no means limited thereto. In other words, the invention may be modified or improved from the embodiment below without departing from the scope and spirit of the invention.

The materials, shapes, design dimensions and other factors of components constituting the connector of the invention can be determined depending on the application of the invention, the state of the art at the time when the invention is carried out, and other conditions. Needless to say, the invention includes equivalents.

In addition, in the following description, three directions intersecting orthogonally to one another are defined as an X direction, a Y direction and a Z direction, with the X direction, the Y direction and the Z direction coinciding with a lateral width direction of the connector, a front-back direction of the connector, and a vertical direction of the connector, respectively. The X direction corresponds to a first direction of the invention, and the Y direction corresponds to a second direction of the invention. Further, the Z direction corresponds to a fitting direction in which the connector and a counter connector are fitted with each other.

In the following explanations regarding shapes, positions and the like of the respective portions of the connector, their shapes, positions and the like when the connector is viewed are described, with the +Z side being an upper side of the connector and the −Z side being a lower side of the connector, unless otherwise noted. The +Z side is a side on which the counter connector is situated when viewed in the Z direction from the connector.

in this description, meaning of the terms “orthogonal” or “parallel” encompasses an error range generally allowed in the technical field of the connector and includes the cases where a shift within a range of less than a few degrees (e.g., 2 to 3 degrees) with respect to an exact orthogonality or parallel is present.

For convenience of description, in the following description, fitting of the connector to a counter connector is called “connector fitting,” and the state where the connector is fitted with the counter connector is called “connector fitting state.”

<<Configuration Example of Connector>>

Figure 11:
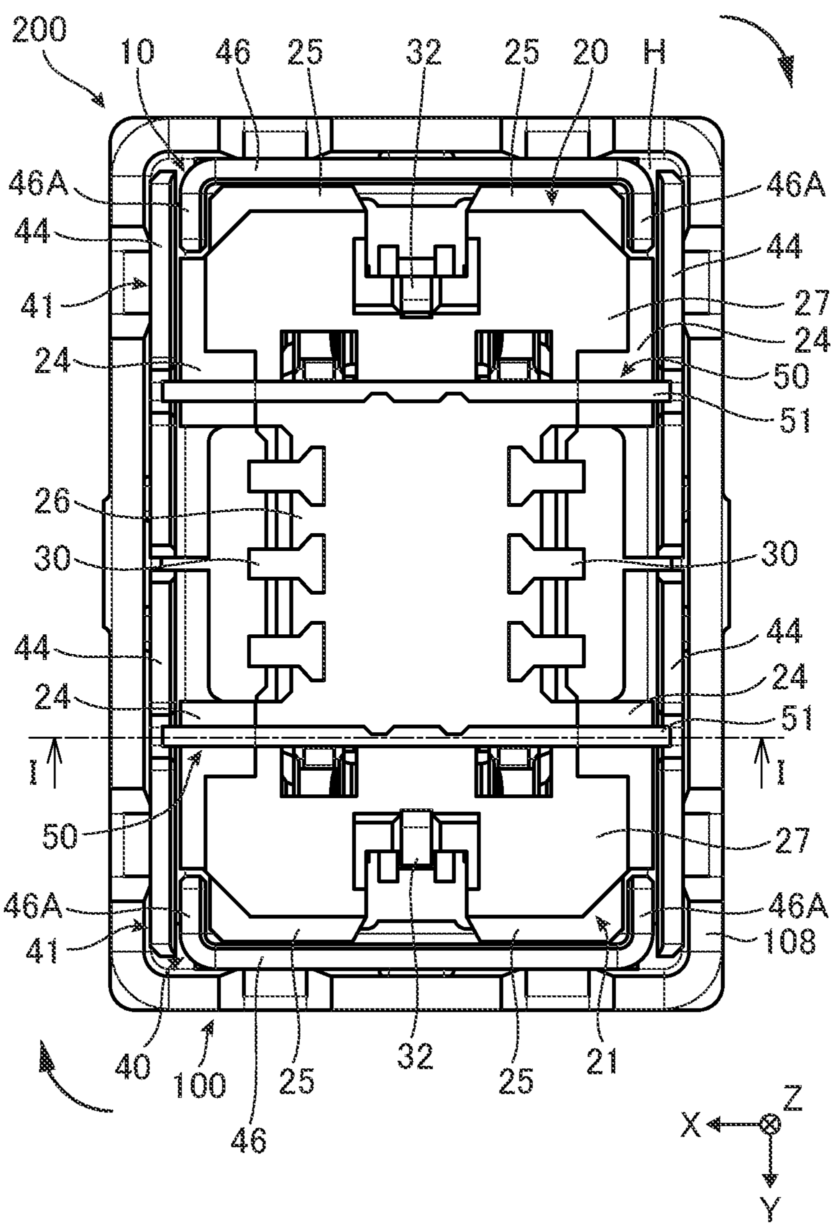
FIG. 11 is a plan view of the connector assembly.
Figure 12:
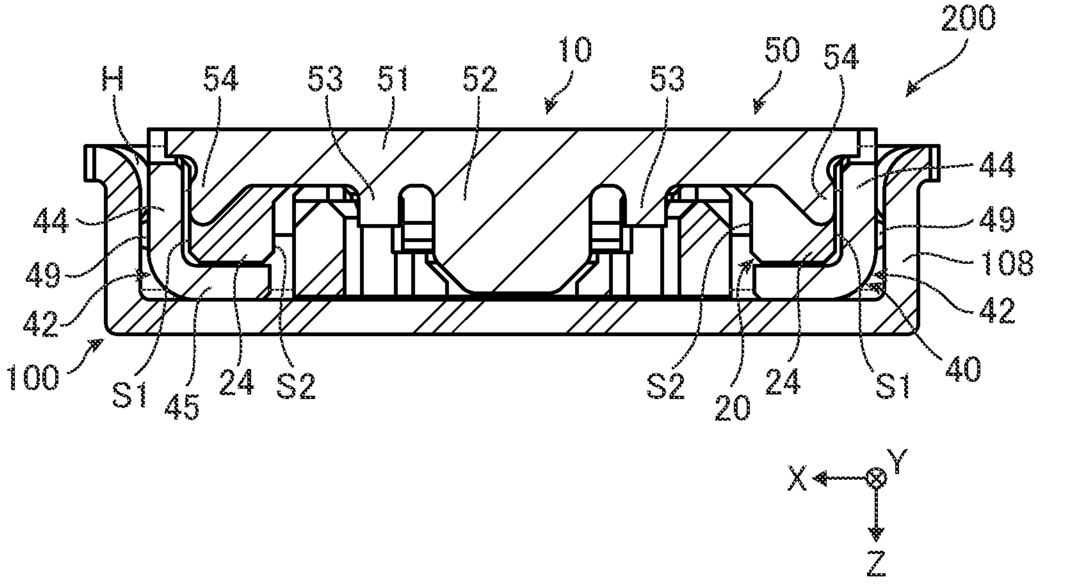
FIG. 12 is a view showing a cross-section taken along I-I in FIG. 11.

The configuration of the connector accord to the embodiment (hereinafter, referred to as “connector 10”) is described with reference to FIGS. 1 to 14. FIG. 12 shows a cross-section taken along I-I in FIG. 11, and the I-I cross-section is a cross-section (XZ, plane) passing a shield plate 50 described later. FIG. 14 shows a cross-section taken along J-J in FIG. 10, and the J-J cross-section is a cross-section (YZ plane) passing a second shield portion 53 of the shield plate 50.

Figure 6:
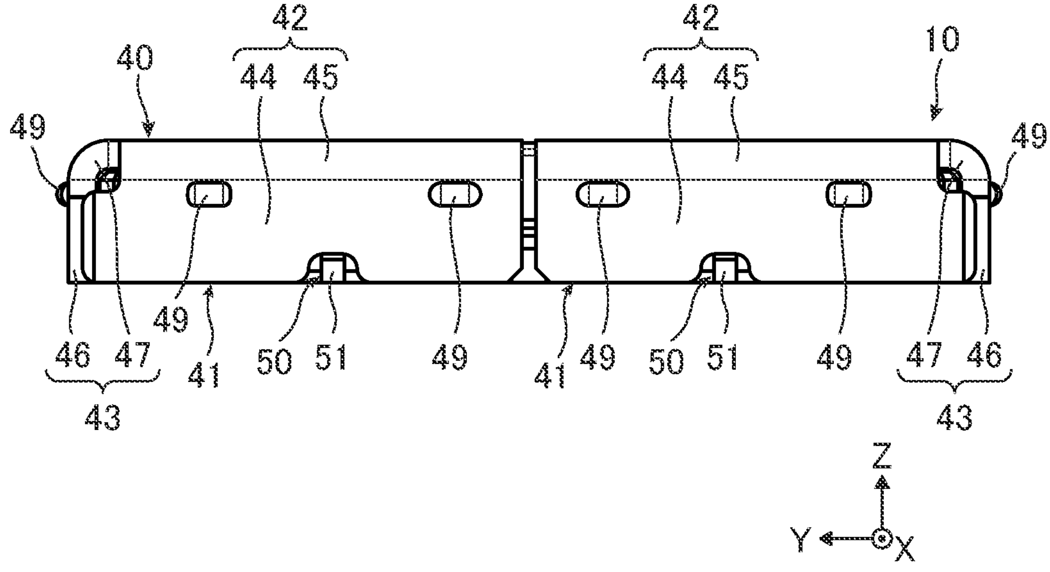
FIG. 6 is a side view of the connector according to the embodiment of the present invention.
Figure 7:
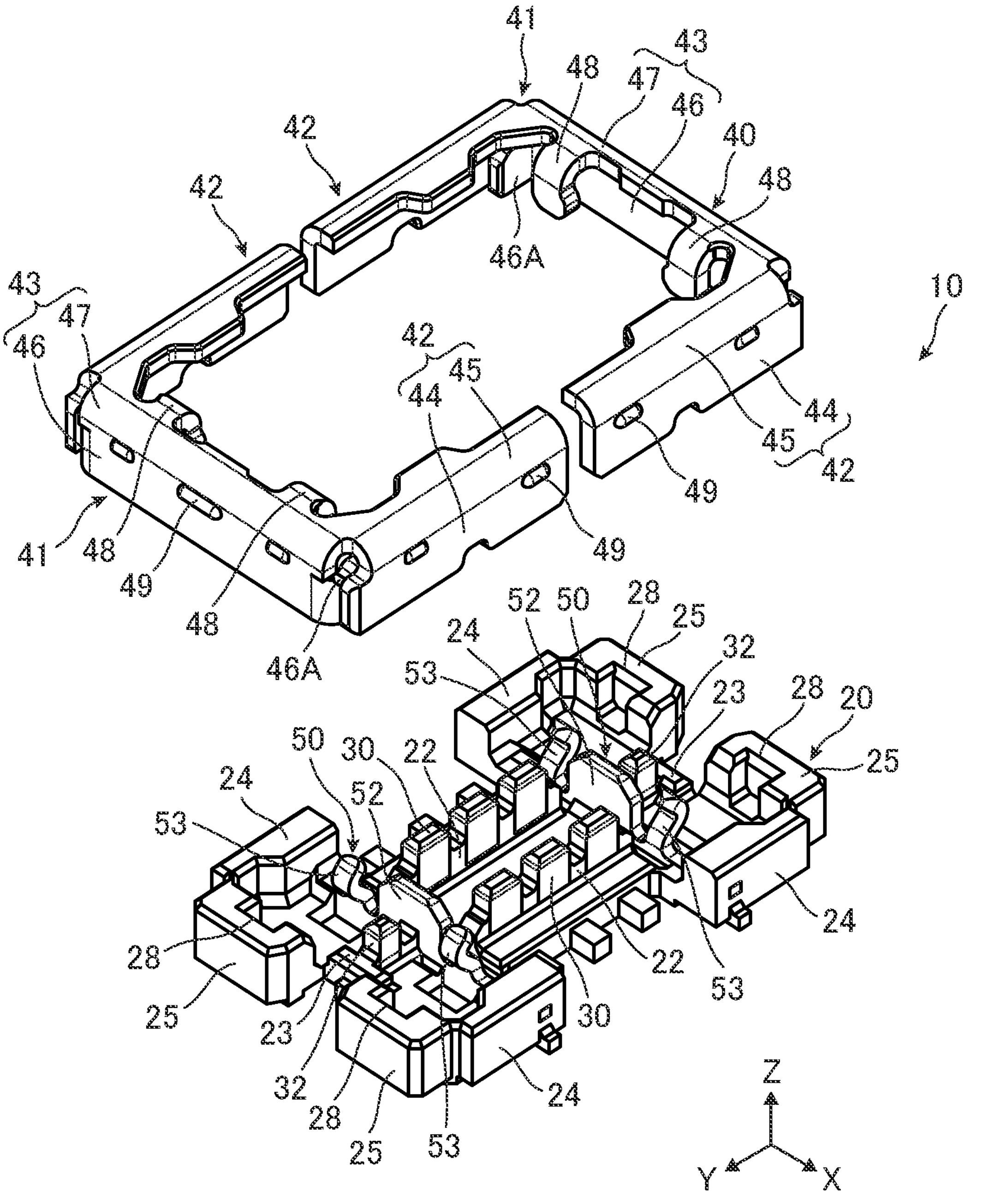
FIG. 7 is an exploded view of the connector according to the embodiment of the present invention.
Figure 8:
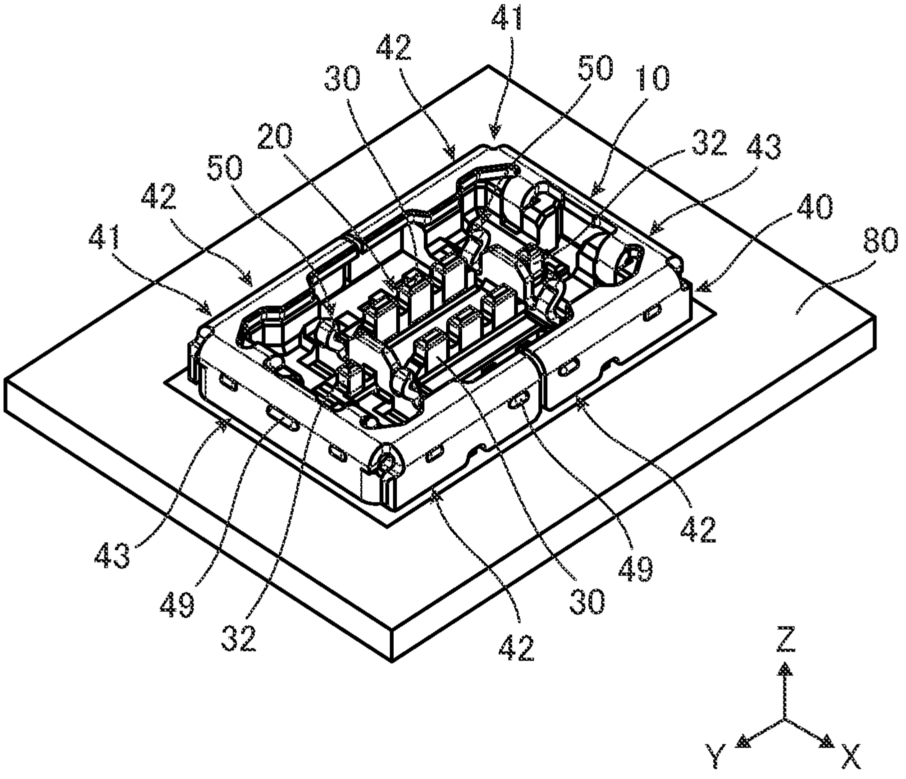
FIG. 8 is a perspective view of the connector mounted on a board.
Figure 9:
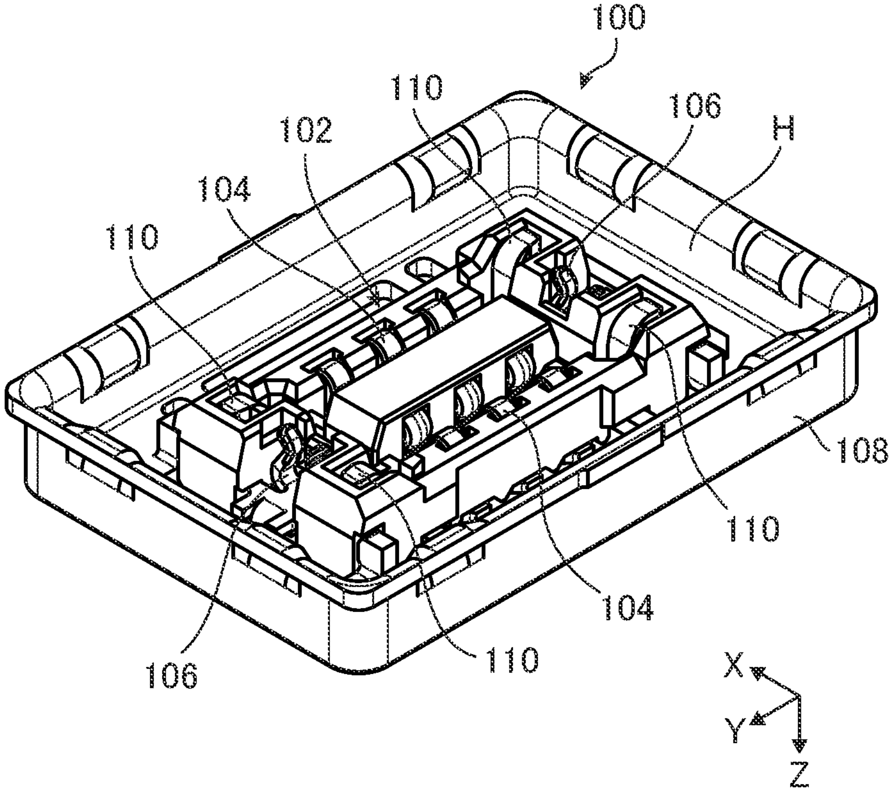
FIG. 9 is a perspective view of a counter connector.
Figure 10:
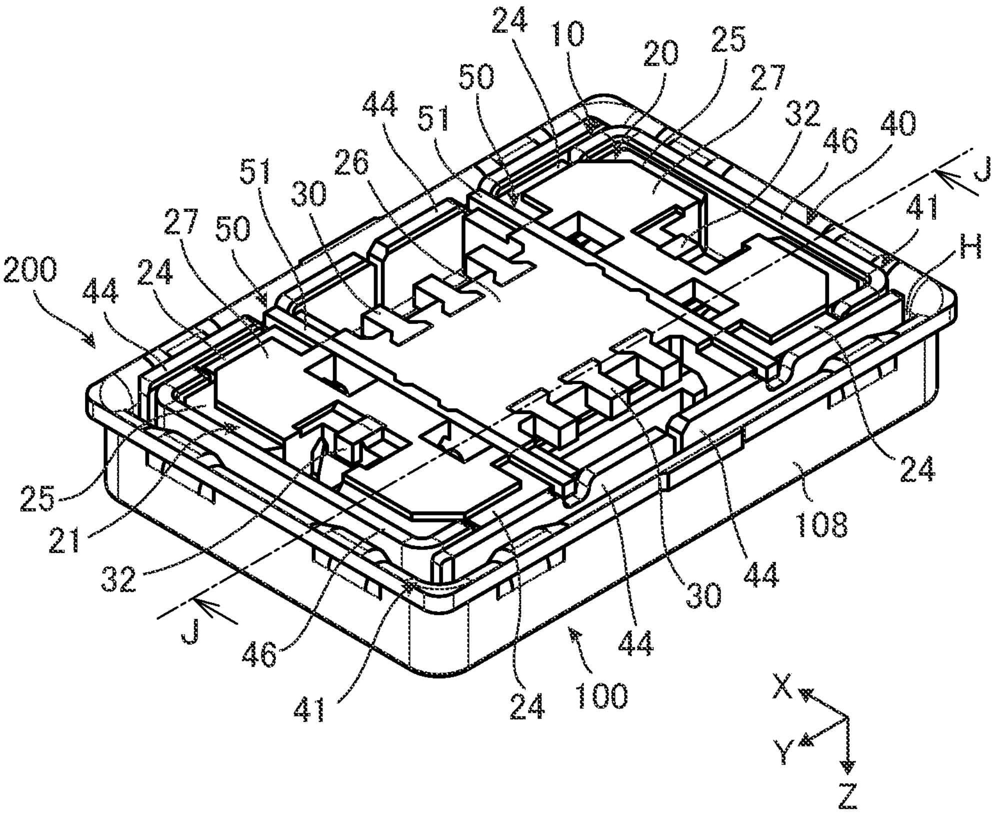
FIG. 10 is a perspective view of a connector assembly.

The connector 10 is a plug connector shown in FIGS. 1 to 7, is mounted on a board 80 as shown in FIG. 8, and can be fitted with a counter connector 100 as a receptacle connector shown in FIG. 9. As can be seen in FIGS. 10 to 12, the connector 10 is fitted with the counter connector 100 in the Z direction to thereby constitute a connector assembly 200.

Figure 1:
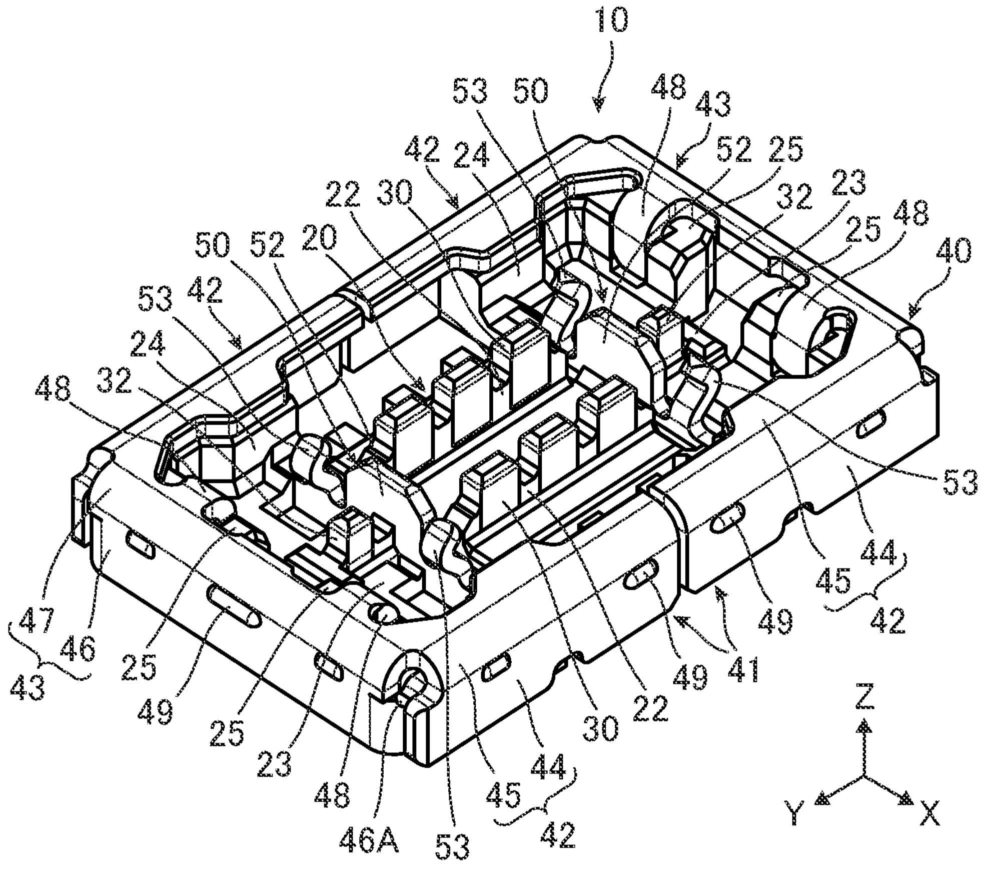
FIG. 1 is a perspective view of a connector according to an embodiment of the present invention when viewed from an upper side.
Figure 2:
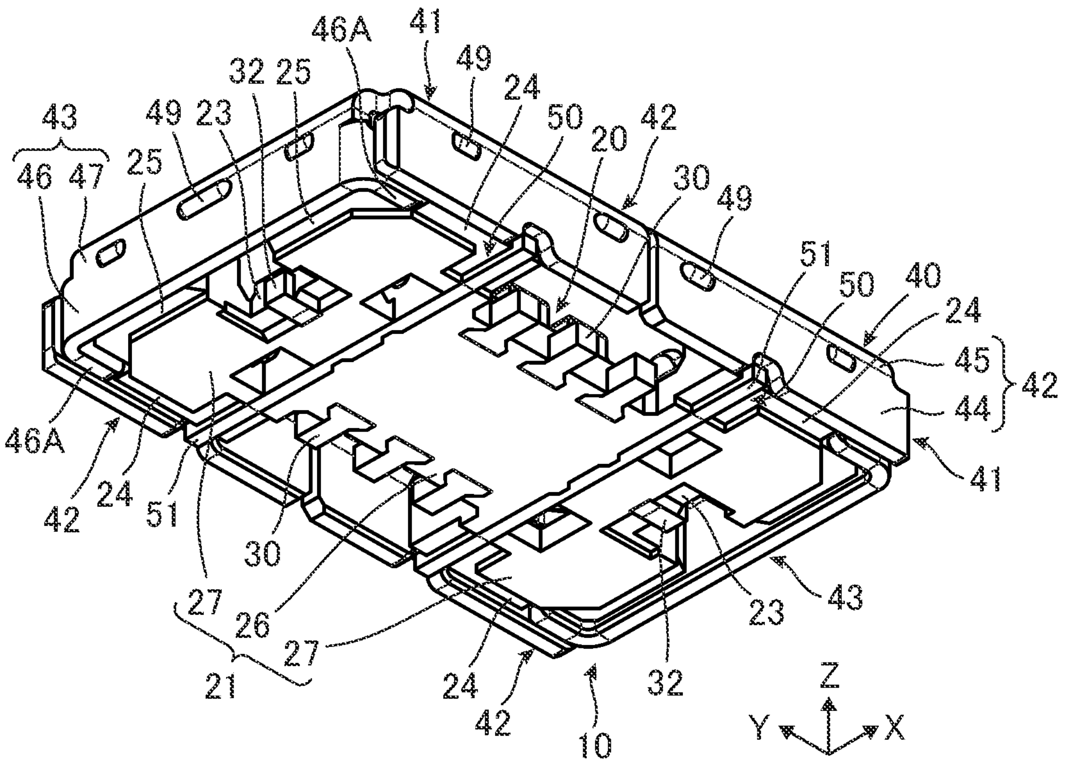
FIG. 2 is a perspective view of the connector according to the embodiment of the present invention when viewed from a lower side.
Figure 3:
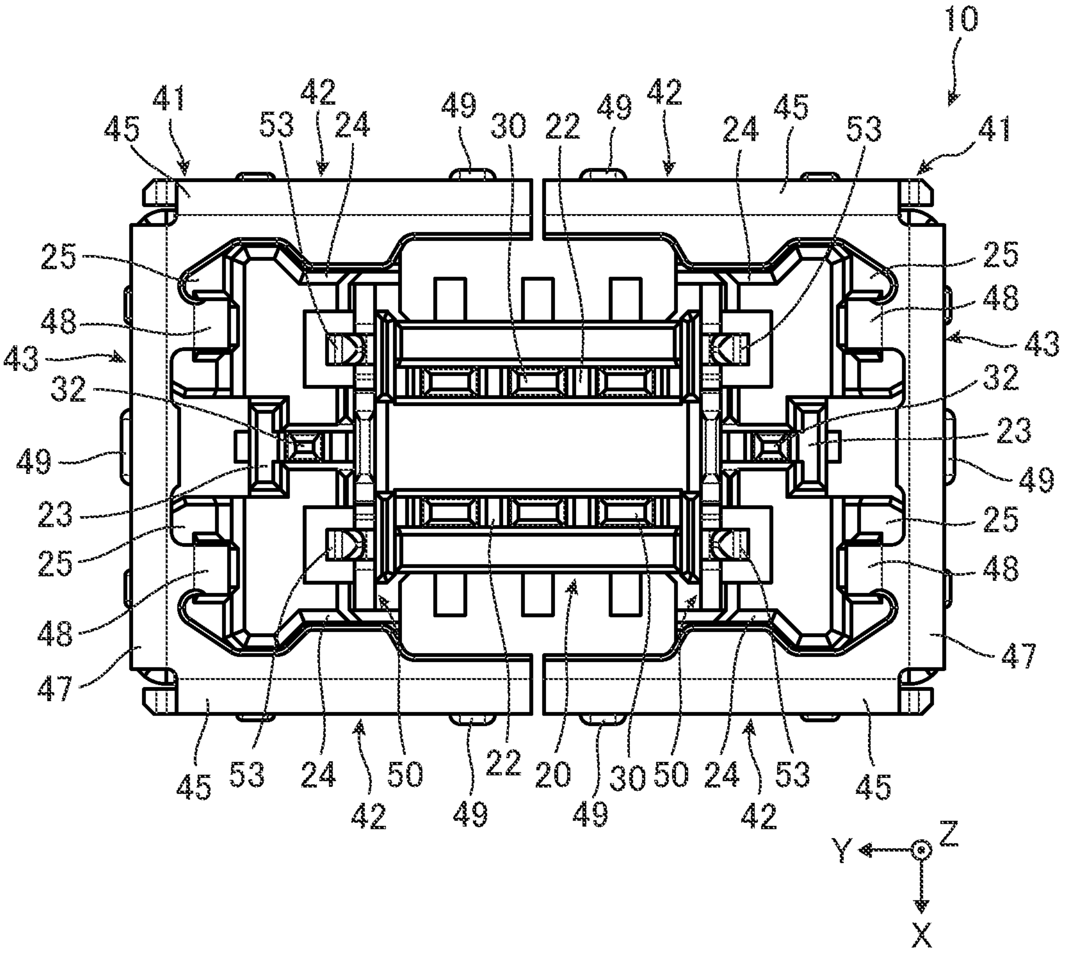
FIG. 3 is a plan view of the connector according to the embodiment of the present invention.
Figure 4:
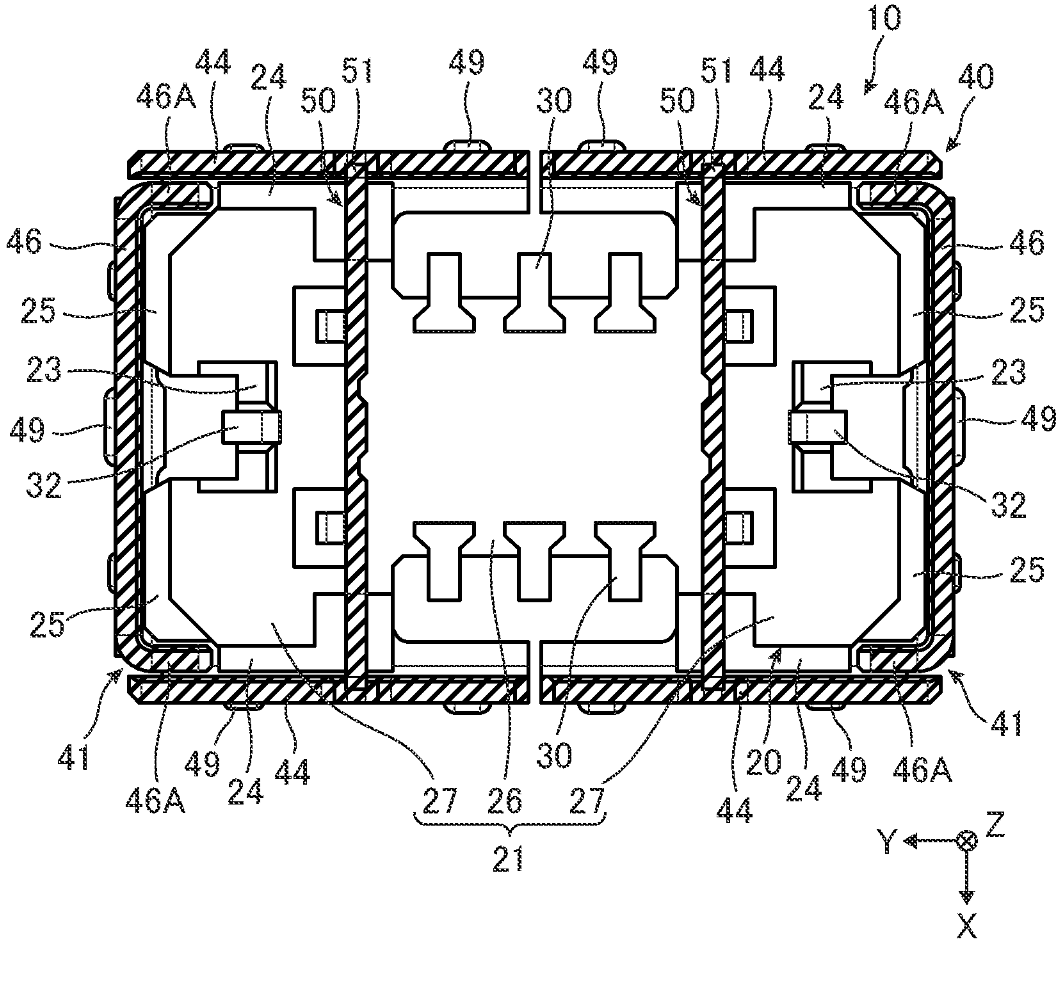
FIG. 4 is a bottom view of the connector according to the embodiment of the present invention.

As shown in FIGS. 1 to 7, the connector 10 includes a housing 20, a plurality of contacts 30, 32, a shell 40 and the shield plate 50. The housing 20 is a component having a substantially H shape in a plan view as shown in FIGS. 3 and 4.

The contacts 30, 32 are signal-transmitting or power-feeding terminals and are fitted into predetermined portions of the housing 20 to be thereby held by the housing 20. The contacts 30, 32 include a contact 32 for high frequency signal transmission, i.e., a terminal for radio frequency (RF). The high frequency is a frequency band of 6 GHz or higher, including a frequency band used in the 5th generation (5G) technology, for example. The contact 32 is provided at each of a +Y side end portion and a −Y side end portion of the housing 20, as shown in FIGS. 1 to 3. The contact 32 on the +Y side and the contact 32 on the −Y side constitute a pair of contacts.

The shell 40 is a frame made of metal, has a rectangular shape in a plan view, and surrounds the housing 20 as shown in FIGS. 1 to 4. A bottom surface (−Z side surface) of the shell 40 is fixed to the board 80. Specifically, of a bottom surface of the connector 10, a region where the board 80 is fixed with solder is obliquely hatched in FIG. 4. As evident from the drawing, the entire periphery of the shell 40 is fixed to the board 80 with solder.

The shield plate 50 is a metal plate extending in the X direction, is attached to the housing 20, and as shown in FIGS. 1 to 4, in the embodiment, is disposed at each of plural sites (two sites in the case shown in the drawings) between the pair of contacts 32 in the Y direction.

In the embodiment, the shield plate 50 is attached to the housing by insert molding. The invention is however not limited to the foregoing, and the shield plate 50 may be attached to the housing 20 in such a manner that the housing 20 is provided with a recess portion (not shown) into which the shield plate 50 is fitted, and the shield plate 50 is press-fitted into the recess portion.

In addition, as shown in FIG. 4, a lower surface (−Z side surface) of the shield plate 50 is fixed to the board 80 with solder. In other words, the shield plate 50 is soldered to the board 80 along the X direction.

The counter connector 100 includes a counter housing 102, a plurality of counter contacts 104, 106, a counter shell 108 as a counter frame, and a counter shield member 110, as shown in FIG. 9.

The counter housing 102 is an insulating resin molded product and is fitted with the housing 20 in the connector fitting state; specifically, protrusions and recesses of the housing 20 are fitted into protrusions and recesses of the counter housing 102.

The counter contacts 104, 106 are constituted of the same number of terminals as that of the contacts 30, 32 and are attached to and held by the counter housing 102 as shown in FIG. 9. Each of the counter contacts 104, 106 corresponds to one of the contacts 30, 32 and, in the connector fitting state, is in contact with and electrically connected to the corresponding content 30, 32.

The counter contacts 104, 106 include a counter contact 106 for high frequency signal transmission. The counter contacts 106 are in a pair and held by the counter housing 102; specifically, the counter contact 106 is attached to each of a +Y side end portion and a −Y side end portion of the counter housing 102.

The counter shell 108 is a frame having a rectangular shape in a plan view and surrounds the counter housing 102. As shown in FIG. 9, an inner space of the counter shell 109 is a recessed space and forms an accommodation space H for accommodating the connector 10. One end in the Z direction of the accommodation space H is an open end. In the process of connector fitting, the connector 10 enters the accommodation space H through the open end. Then, in the fitting state, the entire connector 10 is accommodated in the accommodation space H, as shown in FIG. 10.

The counter shield member 110 is a metal member and is in contact with the shield plate 50 in the connector fitting state, thereby constituting a shield 120 together with the shield plate 50 (see FIG. 14). The shield 120 suppresses crosstalk of signals (particularly, high-frequency signals) between the pair of contacts 32.

The counter shield member 110 is disposed at each of plural sites (two sites in the embodiment) between the pair of counter contacts 106 in the Y direction in a corresponding manner to the shield plate 50.

Next, among the constituent components of the connector 10, the housing 20, the shell 40 and the shield plate 50 will be described in detail.

[Housing]

The housing 20 is an insulating resin molded product (insulator) and has a structure symmetric each in the X direction and the Y direction. The housing 20 includes a bottom portion 21, contact holding portions 22, 23 vertically disposed on the bottom portion 21, and side walls 24, 25 forming an outer edge of the housing 20 as shown in FIGS. 1 to 4 and 7.

The bottom portion 21 includes a center bottom portion 26 situated at the center in the Y direction and side bottom portions 27 separately situated at opposite ends in the Y direction as shown in FIG. 4. The center bottom portion 26 and the side bottom portions 27 are continuous with one another and have their bottom surfaces (−Z side surfaces) in the same plane. In addition, the side bottom portion 27 on the +Y side and the side bottom portion 27 on the −Y side each extend farther outward than the center bottom portion 26 in the X direction.

The contact holding portion 22 is a portion rising in the +Z direction from the center bottom portion 26 and extending in the Y direction, and two contact holding portions 22 are disposed to be separated from each other in the X direction as shown in FIGS. 1, 3 and 7. Each of the contact holding portions 22 is provided with a plurality of recesses arranged in the Y direction at intervals, and the contact 30 is press-fitted into each of the recesses. With the respective contacts 30 being held by the contact holding portion 22, as shown in FIG. 2, the bottom surface of each contact 30 is present in and exposed on the same plane as the bottom surface of the housing 20.

The contact holding portion 23 is vertically disposed in each of the side bottom portions 27 so as to be adjacent to the center bottom portion 26 as shown in FIGS. 1 and 3. Each contact holding portion 23 is provided with a recess, and the contact 32 is press-fitted into the recess. With the contact 32 being held by the contact holding portion 23, as shown in FIG. 2, the bottom surface of the contact 32 is present in and exposed on the same plane as the bottom surface of the housing 20.

The side walls 24, 25 are each a wall vertically rising to the +Z side and disposed to stand at an edge portion of each of the side bottom portions 27. Specifically, as shown in FIG. 7, each end portion in the X direction of the side bottom portions 27 is provided with the side wall 24 (hereinafter, X-directional side wall 24) vertically disposed. The X-directional side wall 24 constitutes an end portion in the X direction of the housing 20.

In addition, of the side bottom portion 27, an edge portion on the opposite side from the center bottom portion 26 in the Y direction is provided with two side walls 25 (hereinafter, Y-directional side walls 25) vertically disposed to be separated from each other in the X direction. Meanwhile, the contact holding portion 23 is disposed between the Y-directional side walls 25 in the X direction as shown in FIGS. 3, 4 and 7.

Figure 13:
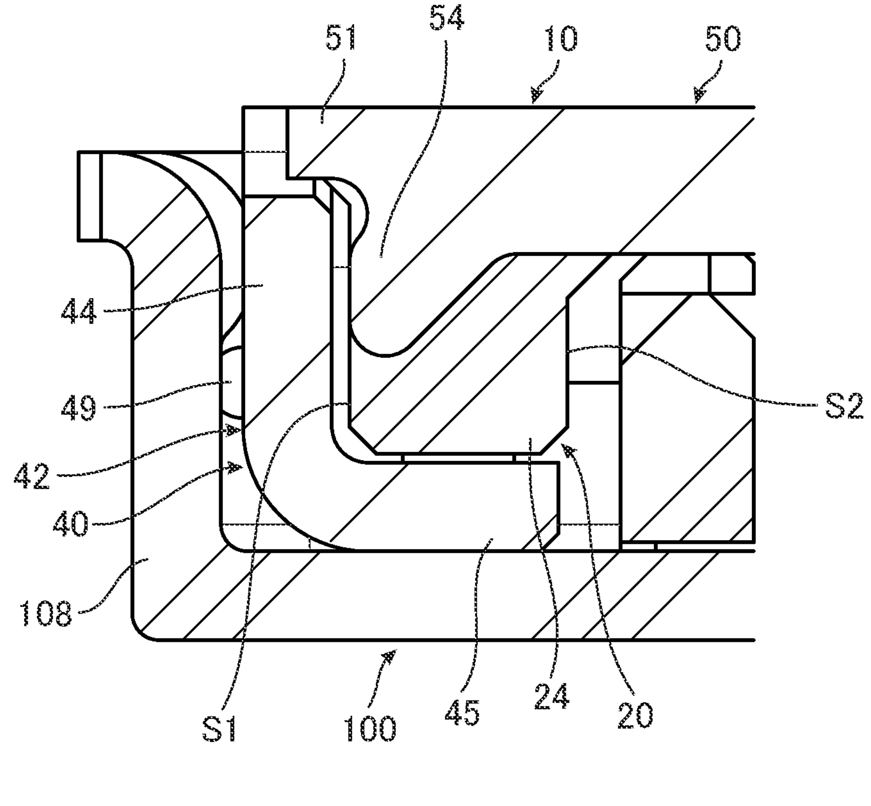
FIG. 13 is an enlarged view of a portion where a side wall is situated in FIG. 12.
Figure 14:
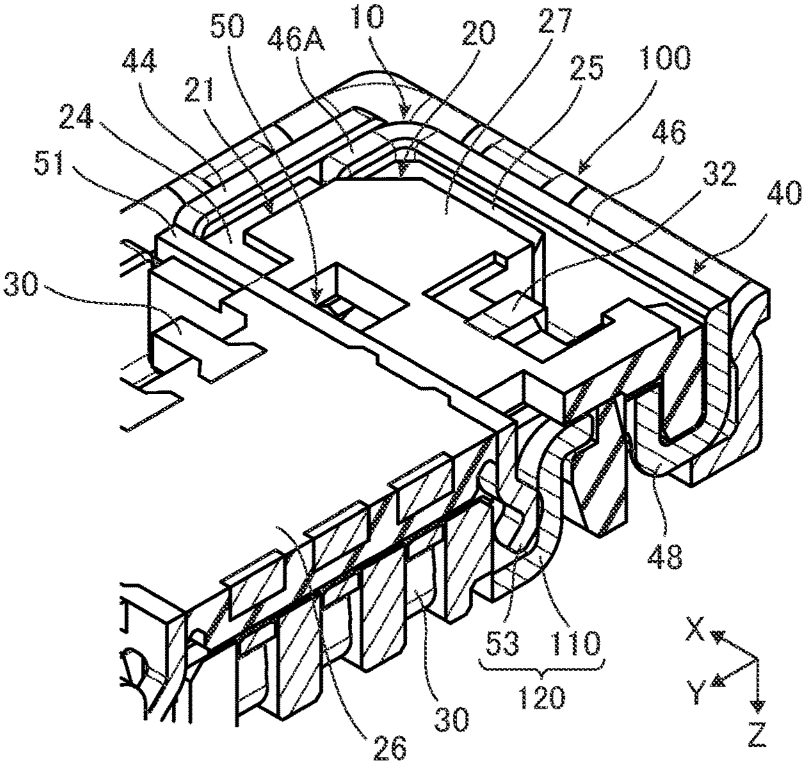
FIG. 14 is a view illustrating a shield and is an enlarged partial view of a cross section taken along J-J in FIG. 10.

Each of the side walls 24, 25 has a thickness and include an outer surface S1 situated on the side facing the shell 40 in the thickness direction, and an inner surface S2 situated on the opposite side from the outer surface S1 (see FIG. 13). The outer surface S1 is a flat surface parallel to the Z direction and is adjacent to an inner peripheral surface of the shell 40. In the embodiment, as shown in FIG. 4, there is a slight gap between the outer surface S1 of each of the side walls 24, 25 and the inner peripheral surface of the shell 40. Meanwhile, the invention is not limited thereto; the cap may be infinitely small, or the outer surface S1 of either of the side walls 24, 25 may abut the inner peripheral surface of the shell 40.

In addition, in the inside thereof in the Y direction, the side wall 25 is provided with an engaging recess portion 28 that is formed to be dented in the Y direction as shown in FIG. 7. With the fitting recess portion 28, an engaging piece 48 of the shell 40 is engaged as shown in FIGS. 1 and 3.

[Shell]

The shell 40 is an electromagnetic shielding frame having an electrical potential set to a ground potential, and is formed of a metal sheet such as a sheet material made of a copper alloy of brass and bronze or stainless steel, for example. The sheet thickness of the metal sheet to form the shell 40 is set to 0.06 mm to 0.15 mm, for example.

The shell 40 in the embodiment is divided into two pieces (hereinafter, shell pieces 41) in the Y direction. The two shell pieces 41 are each shaped in a substantially C-shape in plan view and are disposed such that their ends on the lip side (ends on the opening side) face each other to thereby form the rectangular shell 40 as shown in FIGS. 1 and 3.

The two shell pieces 41 are configured to be symmetrical to each other in the Y direction. As shown in FIGS. 3 to 7, each shell piece 41 includes a pair of first wall portions 42 arranged in parallel with a gap therebetween in the X direction, and a second wall portion 43 situated between the pair of first wall portions 42 in the X direction. Each of the pair of first wall portions 42 includes an extending wall 44 vertically rising to the side and extending in the Y direction and a curved wall 45 curved in a circular arc shape from an end on the side of the extending wall 44 toward the X-directional inner side of the extending wall 44 as shown in FIGS. 6 and 7. The extending wall 44 is provided at a predetermined site in its lower end portion (−Z side end portion) with a cutout in a semicircular shape as shown in FIG. 1. In the semicircular cutout, as shown in FIG. 6, the X-directional end portion of the shield plate 50 (more specifically, end portion of the extending portion 51) is exposed.

Figure 5:
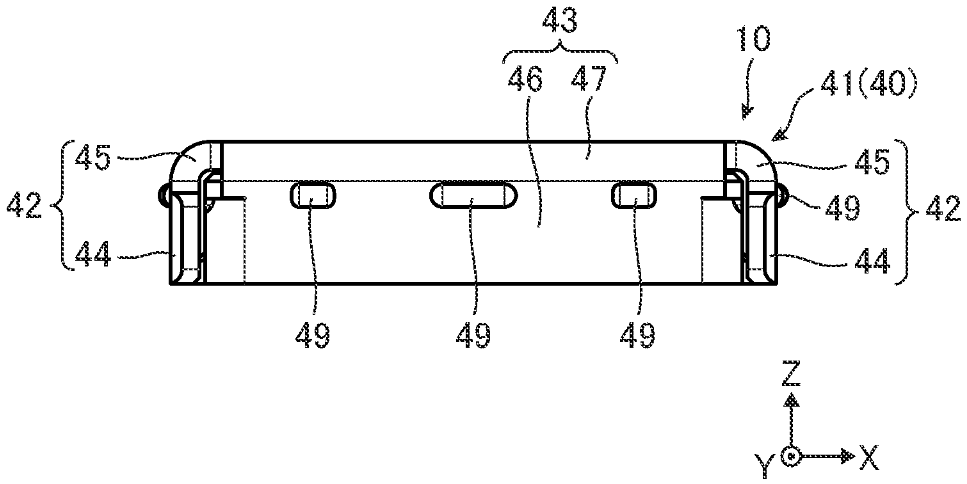
FIG. 5 is a front view of the connector according to the embodiment of the present invention.

The second wall portion 43 includes an extending wall 46 vertically rising to the side and extending in the X direction and a curved wall 47 curved in a circular arc shape from an end on the +Z side of the extending wall 46 toward the Y-directional inner side of the extending wall 46 as shown in FIGS. 5 and 7. X-directional opposite end portions of the extending wall 46 each is bent at a substantially right angle and have a portion that extents toward the Y-directional inner side (hereinafter, extending wall end portion 46A) as shown in FIGS. 2 and 4. The extending wall end portion 46A is disposed so as to be parallel and adjacent to the extending wall 44 of the first wall portion 42 in the X direction as shown in FIG. 4. X-directional opposite end portions of the curved wall 47 of the second wall portion 43 are each continuous with the curved wall 45 of the first wall portion 42 as shown in FIGS. 1 to 3 and 7.

The curved wall 47 is provided with the engaging piece portion 48 that is curved from a Y-directional inner end of the curved wall 47 to the −Z side in a reversed J shape as shown in FIGS. 1 and 7. In addition, each of the first wall portions 42 and the second wall portions 43 is provided with a protrusion portion 49 that juts from an outer peripheral surface of the extending wall 44 or 46 in a bead shape as shown in FIG. 7.

The shell 40 configured as described above is assembled to the upper end portion of the housing 20 through insertion of the engaging piece portions 48 into the engaging recess portions 28 as shown in FIG. 1. Accordingly, the housing 20 is surround by the shell 40, and the contacts 30, 32 held by the housing 20 are disposed at predetermined locations inside the shell 40.

In the connector fitting state, the shell 40 is in contact with the counter shell 108 in the X direction and the Y direction. Specifically, as shown in FIGS. 11 and 12, the protrusion portions 49 provided to outer peripheral surfaces of the extending walls 44, 46 are brought into contact with inner peripheral surfaces of the counter shell 108.

[Shield Plate]

The shield plate 50 is formed of a member having the higher rigidity than that of the housing 20, specifically, a metal member, and examples thereof include a sheet material made of a copper alloy of brass and bronze or the like. The sheet thickness of the metal sheet to form the shield plate 50 is designed to fall within the range of 0.06 mm to 0.15 mm, for example.

In the embodiment, the shield plate 50 doubles as a reinforcing member of the invention and exhibits a function of improving the strength of the connector 10 against an external force, more specifically, improving the strength in the X direction of the side walls 24 of the housing 20. This will be described later in detail.

The shield plate 50 extends long in the X direction, is fixed to the board 80 by solder and is brought into contact with a grounding pattern (not shown) formed on the board 80 to be thereby connected to a ground potential. In addition, the shield plate 50 is attached to the housing 20 by insert molding and is thus integrated with the housing 20. With the shield plate 50 being attached to the housing 20, the bottom surface of the shield plate 50 is present in and exposed on the same plane as the bottom surface of the housing 20 as shown in 2.

In addition, in the embodiment, a plurality of shield plates 50 are disposed between the pair of contacts 32 in the Y direction. Specifically, as shown in FIGS. 3 and 4, two shield plates 50 are arranged on opposite sides of the contact holding portions 22 holding a plurality of contacts 30. In the connector fitting state, together with the corresponding counter shield member 110, each of the two shield plates 50 constitutes the shield 120.

The shape of the shield plate 50 will be described with reference to FIGS. 1 to 4, 7, 12 and 13.

The shield plate 50 is provided at its lower end portion (−Z side end portion) with an extending portion 51 linearly extending in the X direction. The extending portion 51 has a prismatic, rod-like shape and is embedded in the bottom portion 21 of the housing 20 with the lower surface of the extending portion 51 being exposed as shown in FIG. 2. The extending portion 51 has its ends each projecting farther than the housing 20 to the X-directional outer side to be present in the semicircular cutout formed at the lower end portion of the extending wall 44 in the shell 40 as shown in FIG. 2.

The lower surface of the extending portion 51 is fixed to the board 80 with solder, and in the embodiment, the extending portion 51 is soldered entirely and continuously from one end to the other end thereof in the X direction. Meanwhile, the invention is not limited thereto, and the extending portion 51 may be intermittently soldered in the X direction and may have a region free of solder in the middle thereof in the X direction.

In the X-directional center portion of the extending portion 51, first shield portion 52 vertically rising to the +Z side are provided to be continuous with the extending portion 51 as shown in FIGS. 1, 3 and 7. In addition, on opposite sides in the X direction of each first shield portion 52, as shown in FIGS. 1, 3 and 7, second shield portions 53 rising to the +Z side was curving are provided to be continuous with the extending portion 51. The second shield portions 53 separately disposed on the +X side and the −X side are each curved in a S shape in a lateral view and have elasticity.

In the connector fitting state, each second shield portion 53 is pressed by the counter shield member 110 to elastically deform as shown in FIG. 14, being kept in contact with the counter shield member 110. The shield plate 50 and the counter shield member 110 together constitute the shield 120 in this state.

In an outside of each second shield portion 53 in the X direction, as shown in FIG. 12, a projection portion 54 projecting from the +Z side end surface of the extending portion 51 is provided to be continuous with the extending portion 51. The projection portion 54 is disposed at each of the X-directional, opposite end portions of the shield plate 50 and projects in an oblique direction with respect to the extending portion 51.

The projection portion 54 is embedded in the corresponding side wall 24 among the two side walls 24 arranged in the X direction as shown in FIG. 13, resulting from attachment of the shield plate 50 to the housing 20 by insert molding. Specifically, the projection portion 54 provided, at the +X side end portion of the shield plate 50 is embedded in the side wall 24 on the +X side, while the projection portion 54 provided at the −X side end portion of the shield plate 50 is embedded in the side wall 24 on the −X side. Since each projection portion 54 projects in an oblique direction as described above, the projection portion 54 is embedded in the side wall 24 so as not to be easily pulled out.

As above, the projection portion 54 that is part of the shield plate 50 is attached to the side wall 24 while being interposed between the outer surface S1 and the inner surface S2 of the side wall 24 in the embodiment. The strength of the side wall 24 against an external force can be thus improved.

To be more specific, in the connector fitting state, the shell 40 is in contact with the counter shell 108 at all times. In this state, for example, when the connector 10 moves in a direction in which the connector 10 rotates about a Z axis with respect to the counter connector 100 (direction shown by bold arrows in FIG. 11), the shell 40 is pressed toward the X-directional inner side by the counter shell 108. Due to the pressing force, the first wall 42 of the shell 40 shifts to the X-direction inner side and abuts the side wall 24 in the X direction in the housing 20. Accordingly, the side wall 24 receives an external force toward the X-directional inner side (hereinafter, external force at rotation) from the shell 40. Since being a resin molded product, the side wall 24 deforms to bend to the X-directional inner side upon receipt of the external force at rotation and may be damaged or broken when an amount of its deformation is large.

In the connector 10 of the embodiment, on the other hand, since the projection portion 54 is interposed between the outer surface S1 and the inner surface S2 of the side wall 24, the external force at rotation applied to the side wall 24 is received by the projection portion 54. In this manner, the deformation of the side wall 24 can be regulated, and a damage and a breakage of the side wall 24 can be thus suppressed, whereby the connector 10 can be protected. In other words, the shield plate 50 capable of receiving the external force at rotation by means of the projection portion 54 serves as a reinforcing member for improving the strength of the side wall 24 in the connector 10.

In the embodiment, the protection portion 54 extends toward the X-directional outer side, and a top end surface (end surface on the X-directional outer side) thereof is, as shown in FIG. 13, disposed in the same plane as the outer surface S1 of the side wall 24 in the X direction and continues with the outer surface S1. With this configuration, the effect of the shield plate 50 to resist an external force at rotation is more suitably exhibited. Here, the tip end surface of the projection portion 54 only needs to be present in the same plane as the outer surface S1 and exposed as being surrounded by the outer surface S1, and, for example, a gap may be provided between the tip end surface of the projection portion 54 and the outer surface S1.

In the embodiment, the shield plate 50 is fixed to the board 80 with solder along the X direction and is provided with the projection portions 54 at the X-directional end portions of the shield plate 50. With this configuration, since the shield plate 50 is soldered (fixed) to the board 80 along a direction in which the external force at rotation is applied, the effect of the shield plate 50 to resist the external force at rotation is more effectively exhibited in cooperation with a bonding force of the solder to the board 80.

In the embodiment, the shell 40 is in contact with the counter shell 108 via the protrusion portion 49 in the connector fitting state as described above. With this configuration, since the shell 40 receives an abutting force from the counter shell 108 so as to easily deform toward the X-directional inner side, the side walls 24 in the X direction easily receive the external force at rotation. In such configuration, the effect of the shield plate 50 to resist the external force at rotation is more significant.

Other Embodiments

While configurations of the connector and the connector assembly of the invention have been described above with reference to a specific example, the foregoing embodiment is mere an example used to facilitate the understanding of the invention, and there may be other embodiments.

Figure 15:
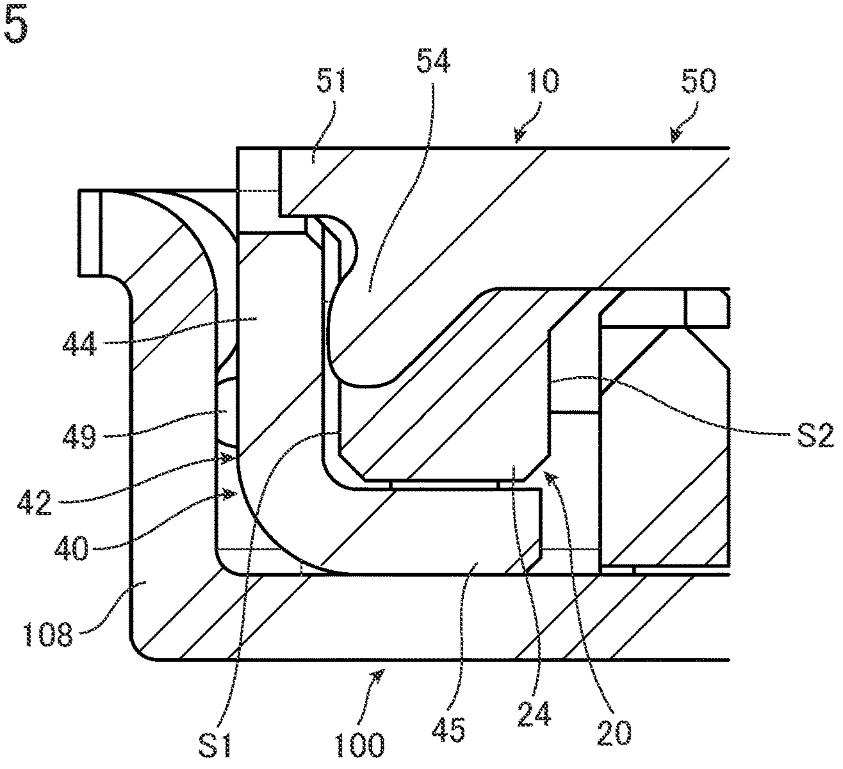
FIG. 15 is a cross-sectional view showing a structure of a portion around a side wall according to a modification.
Figure 16:
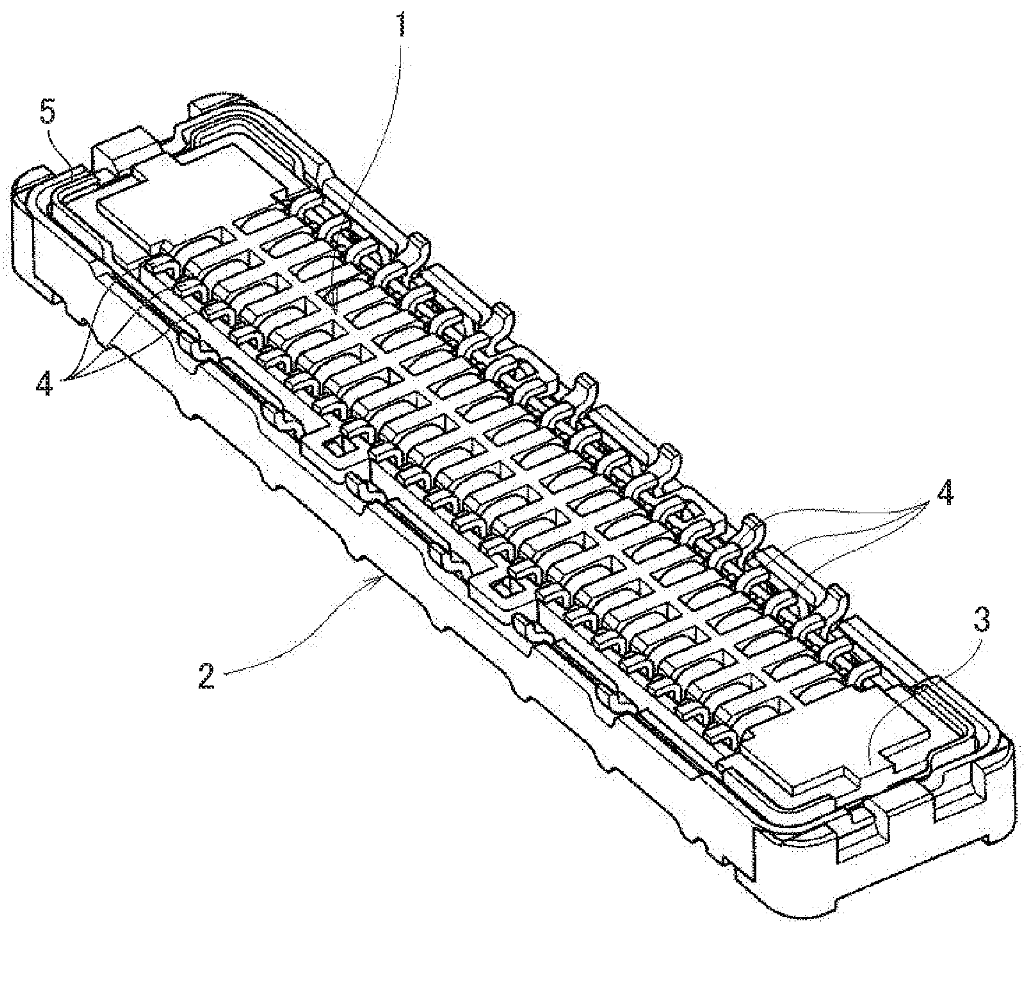
FIG. 16 PRIOR ART
FIG. 16 is a perspective view showing a conventional connector and showing a state as being fitted with a counter connector.
Figure 17:
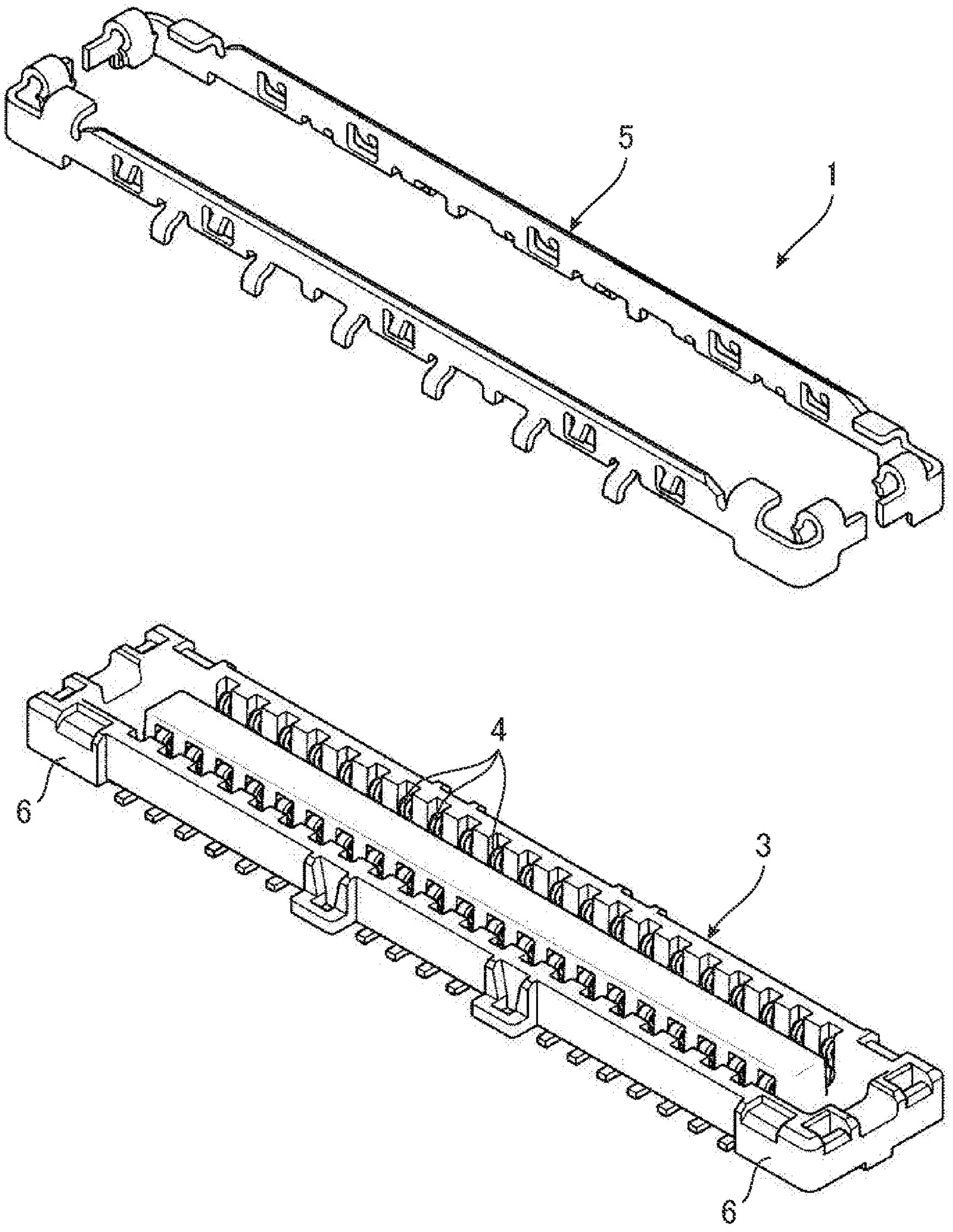
FIG. 17 PRIOR ART
FIG. 17 is an exploded view of the conventional connector.

In the foregoing embodiment, of the shield plate 50, the portion embedded in the side wall 24 (i.e., projection portion 54) has its end surface disposed in the same plane as the outer surface S1 of the side wall 24 as shown in FIG. 13. This is not the sole case, however, and as shown in FIG. 15, a tip end portion of the projection portion 54 may project outward from the outer surface S1 in the X direction. With this configuration also, the projection portion 54 of the shield plate 50 receives the external force at rotation, and hence deformation and breakage of the side wall 24 due to an external force can be suppressed.

It should be noted that FIG. 15 shows a cross-sectional structure of a region around the side wall 24 according to a modification and is a view correspond to FIG. 13.

Although not specifically shown, the projection portion 54 may have its end surface situated on an inner side of the outer surface S1 of the side wall 24 in the X direction and between the outer surface 31 and the inner surface 62. In this case, in order to suitably exhibit the effect to resist the external force at rotation, a gap between the end surface of the projection portion 54 and the outer wall 61 is preferably not larger than a half of a thickness of the shield plate 50.

In the foregoing embodiment, the shield plate 50 doubles as a reinforcing member for improving the strength of the side wall 24, that is, the reinforcing member constitutes the shield 120. In this case, the number of the constituent components of the connector 10 decreases. Meanwhile, this is not the sole case, and the reinforcing member and a component constituting the shield 120 may be different from each other, for example.

In the foregoing embodiment, the reinforcing member is a metal member (metal plate), but this is not the sole case, and the reinforcing member may be a non-metallic member as long as it has the higher rigidity than that of the material constituting the housing 20.

In the foregoing embodiment, the X direction that is the lateral width direction of the connector 10 is defined as the first direction, and in order to improve the strength of the side wall 24 in the X direction, part of the reinforcing member (more specifically, the X-directional end portion of the shield plate 50) is embedded in the side wall 24. This is however not the sole case, and the Y direction that is the front-back direction of the connector 10 may be defined as the first direction. In this case, order to improve the strength of the side wall 25 in the Y direction, a reinforcing member extending in the Y direction may be attached to the housing 20, with a Y-directional end portion of the reinforcing member being embedded in the side wall 25.

In the foregoing embodiment, the shell 40 has a rectangular outer shape in a plan view, but this is not the sole case, and the outer shape thereof may be, in a plan view, a circular shape, a trapezoidal shape, a rhomboid shape or another quadrilateral shape other than a rectangular shape, or a polygonal shape other than a quadrilateral shape.

In the foregoing embodiment, the shell 40 that is a frame is divided into the two shell pieces 41 having the same shape, but this is not the sole case. For instance, the shell 40 may be consisted of a single continuous body (specifically, an inseparable frame).

What is claimed is:

1. A connector that can be fitted with a counter connector by entering an accommodation space of the counter connector, the connector comprising:

a housing that holds a contact and includes a side wall at an end portion in a first direction intersecting a fitting direction in which the connector and the counter connector are fitted with each other;

a frame that surrounds the housing; and a reinforcing member having a higher rigidity than a rigidity of the housing, wherein a part of the reinforcing member is attached to the side wall while being interposed between an outer surface and an inner surface of the side wall, the outer surface being situated on a side facing the frame, and the inner surface being situated on an opposite side from the outer surface.

2. The connector according to claim 1, wherein the reinforcing member is fixed to a board with solder along the first direction, and wherein the end portion in the first direction of the reinforcing member is attached to the side wall while being interposed between the outer surface and the inner surface.

3. The connector according to claim 1, wherein, in a state where the connector is fitted with the counter connector, the frame is in contact with a counter frame of the counter connector in the first direction.

4. The connector according to claim 1, wherein side walls are separately provided at opposite ends in the first direction of the housing, each of the side walls being the side wall, wherein the reinforcing member extends along the first direction, and wherein each of opposite ends in the first direction of the reinforcing member is attached to a corresponding side wall of the side walls while being interposed between the outer surface and the inner surface of the corresponding side wall.

5. The connector according to claim 1, wherein, for the reinforcing member, an end surface of the part attached to the side wall is disposed in a same plane as the outer surface in the first direction and is continuous with the outer surface.

6. The connector according to claim 1, wherein, for the reinforcing member, the part attached to the side wall includes a portion projecting outward from the outer surface in the first direction.

7. The connector according to claim 1, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

8. The connector according to claim 7, wherein a plurality of the reinforcing members are disposed between the pair of contacts in the second direction, and wherein each of the plurality of the reinforcing members constitutes the shield.

9. The connector according to claim 7, wherein each of the pair of contacts is a contact for high-frequency signal transmission.

10. The connector according to claim 1, wherein the housing is a resin molded product, wherein the reinforcing member is a metal member, and wherein the part of the reinforcing member is embedded in the side wall.

11. The connector according to claim 10, wherein the reinforcing member includes an extending portion extending linearly in the first direction and a projection portion projecting from an end surface of the extending portion in the fitting direction, and wherein the projection portion is embedded in the side wall.

12. A connector assembly configured such that a connector enters an accommodation space of a counter connector to be thereby fitted with the counter connector, the connector comprising:

a housing that holds a contact and includes a side wall at an end portion in a first direction intersecting a fitting direction in which the connector and the counter connector are fitted with each other, a frame that surrounds the housing, and a reinforcing member having a higher rigidity than that of the housing, wherein a part of the reinforcing member is attached to the side wall while being interposed between an outer surface and an inner surface of the side wall, the outer surface being situated on a side facing the frame, and the inner surface being situated on an opposite side from the outer surface.

13. The connector according to claim 2, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

14. The connector according to claim 3, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

15. The connector according to claim 4, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

16. The connector according to claim 5, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

17. The connector according to claim 6, wherein a plurality of the contacts are held by the housing, wherein the plurality of the contacts include a pair of contacts separately disposed at different locations in a second direction intersecting both the fitting direction and the first direction, and wherein the reinforcing member is disposed between the pair of contacts in the second direction and constitutes a shield.

* * * * *